(12) United States Patent
Kirby et al.

(10) Patent No.: US 11,273,739 B2
(45) Date of Patent: Mar. 15, 2022

(54) STOWABLE SEAT BASE

(71) Applicants: Roger Kirby, San Clemente, CA (US); James Spencer, Phoenix, AZ (US)

(72) Inventors: Roger Kirby, San Clemente, CA (US); James Spencer, Phoenix, AZ (US)

(*) Notice: Subject to any disclaimer, the term of this patent is extended or adjusted under 35 U.S.C. 154(b) by 0 days.

(21) Appl. No.: 16/416,254

(22) Filed: May 19, 2019

(65) Prior Publication Data
US 2020/0247286 A1    Aug. 6, 2020

Related U.S. Application Data

(60) Provisional application No. 62/677,668, filed on May 30, 2018.

(51) Int. Cl.
*B60N 2/50* (2006.01)
*B60N 2/015* (2006.01)

(52) U.S. Cl.
CPC ......... *B60N 2/507* (2013.01); *B60N 2/01583* (2013.01)

(58) Field of Classification Search
CPC ...... B60N 2/507; B60N 2/01583; B60N 2/32; A47C 4/02; A47C 4/28
USPC ...................................... 296/65.03
See application file for complete search history.

(56) References Cited

U.S. PATENT DOCUMENTS

| | | | | |
|---|---|---|---|---|
| 1,693,633 A * | 12/1928 | Allen | ................... | B60N 2/2848 |
| | | | | 280/31 |
| 1,727,335 A * | 9/1929 | Chatfield | ................... | B62B 7/12 |
| | | | | 280/31 |
| 2,508,627 A * | 5/1950 | Spiegel | ................ | A47B 3/0912 |
| | | | | 108/19 |
| 6,161,486 A * | 12/2000 | Boots | ....................... | A47B 5/06 |
| | | | | 108/33 |
| 7,690,316 B2 * | 4/2010 | Yoo | .......................... | E04G 1/34 |
| | | | | 108/115 |
| 8,695,932 B1 * | 4/2014 | Balsis, III | ............. | B60N 2/015 |
| | | | | 248/188.2 |
| 2003/0011221 A1 * | 1/2003 | Yoshie | .................. | A47D 1/002 |
| | | | | 297/130 |
| 2005/0230995 A1 * | 10/2005 | Tame | .................... | B60N 2/305 |
| | | | | 296/65.03 |
| 2006/0108822 A1 * | 5/2006 | Tame | .................... | B60N 2/305 |
| | | | | 296/65.11 |

(Continued)

FOREIGN PATENT DOCUMENTS

| | | | | |
|---|---|---|---|---|
| CA | 2533727 A1 * | 2/2005 | ............. | B60N 2/206 |
| EP | 1834831 A2 * | 9/2007 | ........... | B60N 2/1615 |
| WO | WO-2004108470 A2 * | 12/2004 | ........... | B60N 2/3065 |

*Primary Examiner* — Hilary L Gutman

(57) ABSTRACT

The seat base may include a frame with a polygonal geometry, a first leg assembly hingedly coupled to the frame, and a second leg assembly hingedly coupled to the frame. The seat base may also include a first leg hingedly coupled to the frame, a second leg hingedly coupled to the frame, and a cross member coupled to the first leg and the second leg. A guide may protrude from the frame. The guide may define a recess. A retention pin may engage the recess and retain the first leg assembly in a deployed position. The frame may also have quadrilateral perimeter. The seat base may further include an interior cross member fixedly coupled to the frame, and a pin protruding from the cross member. The pin may engage a seat. A loop may extend from the frame and engage the seat.

14 Claims, 21 Drawing Sheets

(56) References Cited

U.S. PATENT DOCUMENTS

| | | | |
|---|---|---|---|
| 2009/0033122 A1* | 2/2009 | Stefanon | B60N 2/01508 296/65.03 |
| 2012/0313395 A1* | 12/2012 | Newberg | B60R 5/04 296/65.03 |
| 2013/0140797 A1* | 6/2013 | Fritz | B62B 9/245 280/649 |
| 2017/0174101 A1* | 6/2017 | Gebauer | B60N 2/01516 |
| 2019/0021506 A1* | 1/2019 | Friede | B60N 2/015 |
| 2020/0156514 A1* | 5/2020 | Sweeney | A47C 4/028 |

* cited by examiner

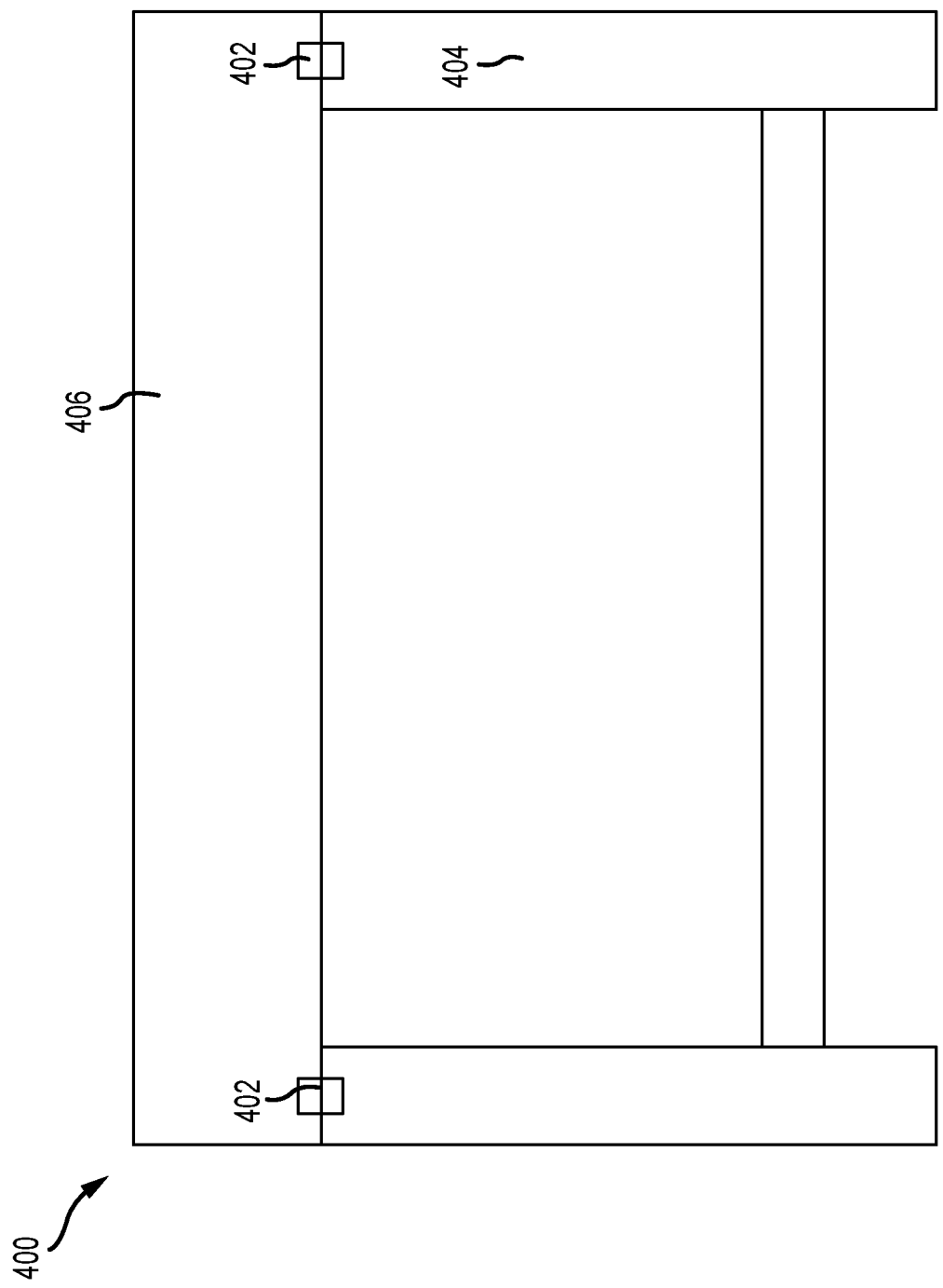

STOWABLE SEAT BASE

CROSS REFERENCE TO RELATED APPLICATIONS

This application claims priority to U.S. Provisional Application No. 62/677,668 entitled STOWABLE SEAT BASE and filed on May 30, 2018, which is incorporated herein by reference in its entirety.

FIELD

The present disclosure relates to stowable seat bases.

BACKGROUND

Off-road vehicles take their drivers to remote places far from many creature comforts like outdoor seating. These vehicles often offer limited space for cargo. A beach chair, for example, might take up space in a vehicle that could otherwise transport other items. Owners can sometimes remove the chairs from their vehicles, but those chairs sit flat on the ground at a height unsuitable for comfortably sitting.

SUMMARY

In various embodiments, a stowable seat base is disclosed. The seat base may include a frame with a polygonal geometry, a first leg assembly hingedly coupled to the frame, and a second leg assembly hingedly coupled to the frame. The seat base may also include a first leg hingedly coupled to the frame, a second leg hingedly coupled to the frame, and a cross member coupled to the first leg and the second leg.

In various embodiments, a guide may protrude from the frame. The guide may define a recess. A retention pin may engage the recess and retain the first leg assembly in a deployed position. The frame may also have quadrilateral perimeter. The seat base may further include an interior cross member fixedly coupled to the frame, and a pin protruding from the cross member. The pin may engage a seat. A loop may extend from the frame and engage the seat.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 4A-4C illustrate a seat base having retention tabs protruding from legs, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
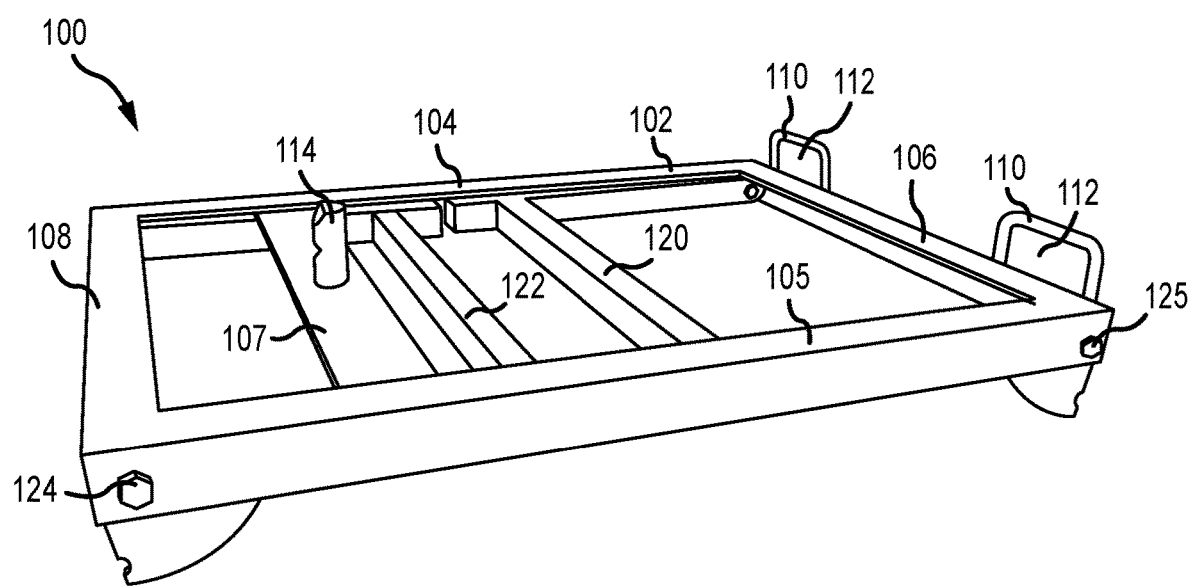
FIGS. 1A-1B illustrate a seat base in a stowed position, in accordance with various embodiments.
Figure 1B:
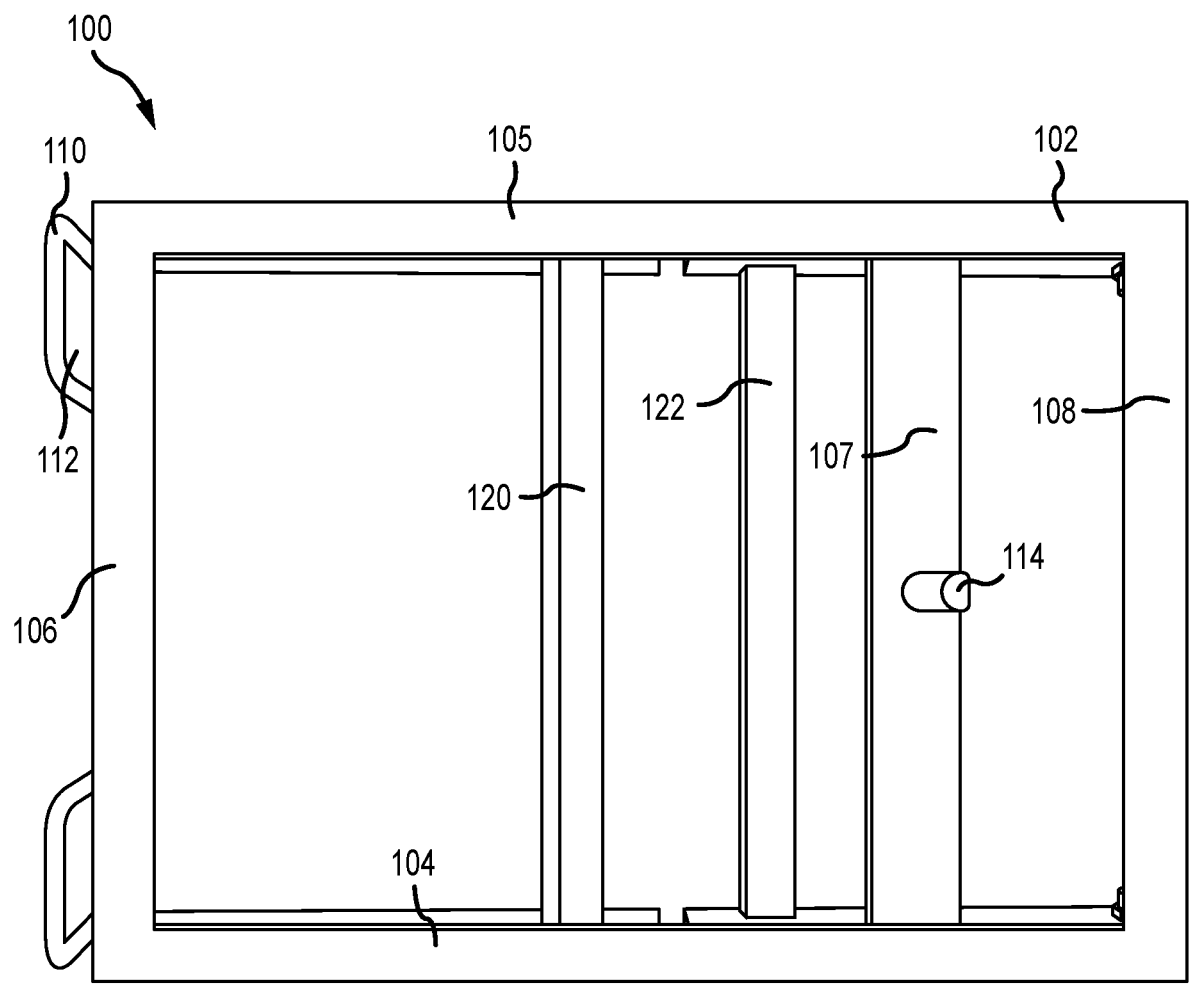

Referring now to FIGS. 1A and 1B, a foldable seat base 100 in a stowed position is shown, in accordance with various embodiments. Foldable seat base 100 comprises a frame 102. Frame 102 may comprise polygonal geometry and include any number of flat sides joined at their ends. In that regard, frame 102 may comprise four or more sides defining an open interior space with the sides arranged in a planar or substantially planar configuration. Frame 102 may also comprise one or more curved sides, though in some embodiments flat sides may allow for manufacturing without bending the side materials.

In various embodiments, frame 102 may comprise side member 104 and side member 105 arranged in a parallel or substantially parallel configuration. Side members 104 and 105 may be fixedly coupled by front cross member 106, interior cross member 107, and rear cross member 108. The term 'front' describes the direction a seat faces when installed on foldable seat base 100. The term 'rear' describes the direction a seat back faces when installed on foldable seat base 100. Side member 104, front cross member 106, side member 105, and rear cross member 108 define a quadrilateral perimeter of seat base 100. Additional members may be coupled along the perimeter to form seat base 100 in shapes other than quadrilateral such as, for example, triangular, pentagonal, hexagonal, circular, semicircular, or other suitable shapes.

In various embodiments, side members 104 and 105 and cross members 106, 107, and 108 may comprise a metal or metal alloy. Examples of alloys include iron, steel, aluminum, titanium, or any other suitable alloy. The metal may come in the form of bar stock, tubing, or other rigid and joinable metal having any cross-sectional shape (commonly available in round or square cross sections), which may then be cut to the desired length and coupled to the adjacent members. For example, side members 104 and 105 may be welded, bolted, riveted, or otherwise fastened to cross members 106, 107, and/or 108.

In various embodiments, side members 104 and 105 and cross members 106, 107, and 108 may also be molded, stamped from sheet metal, machined from base materials, or otherwise formed using metal manufacturing techniques. Side members 104 and 105 and cross members 106, 107, and 108 may also be formed of other materials capable of supporting a seat and a human occupant such as, for example, ceramic, plastic, fibrous composite material, resin, carbon fiber, or wood. Side members 104 and 105 and cross members 106, 107, and 108 may be shaped and/or coupled using known techniques suitable for working with the selected material.

In various embodiments, front cross member 106 may include loops 110 extending from front cross member 106. Loops 110 and front cross member 106 may define opening 112 having a D-shaped geometry, O-shaped geometry, or other suitable geometry for receiving and retaining a fastening member protruding from a seat. Interior cross member 107 may include pin 114 protruding upward from the interior cross member 107 in a direction orthogonal or substantially orthogonal to interior cross member 107. The term 'upward' refers to the direction pointing away from the ground when frame 102 is in a deployed configuration with legs resting on the ground. Interior cross member may comprise a flat upper surface from which pin 114 protrudes. Opening 112 may receive and retain a foot 150 extending from a seat 152, and pin 114 may extend into an opening in seat 152 with seat 152 resting on an upper surface of frame 102, as described in greater detail below.

In various embodiments, front legs 120 and rear legs 122 may fold into the open area defined by frame 102. Front legs 120 may be coupled to frame 102 by a hinge. For example, front legs 120 may comprise an opening aligned with an opening of side member 104 of frame 102 with a pin 125 extending through the opening in front legs 120 and the opening in side member 104. Front legs 120 may pivot on pin 125 with the distal end of front legs 120 moving along an arc in response to pivoting on pin 125. A similar pin arrangement may join front legs 120 with side member 105. Rear legs 122 may be joined to side member 104 and side member 105 in a similar manner by pin 124 or other suitable hinge. In that regard, pin 124 and pin 125 may be a bolt, screw, rod, journal bearing, or other suitable hinge. Although a pin 125 is shown acting as a journal bearing, other types of hinges allowing front legs 120 and/or side legs 122 to fold into the opening defined by frame 102 may also be used.

Referring now to FIGS. 2A-2H, foldable seat base 100 is shown in a deployed position, in accordance with various embodiments. Front legs 120 extend from frame 102 at an angle α. Angle α may be 90 degrees or greater to enhance stability, though an angle α less than 90 degrees may still function as a seat base. For example, angle α may approximately 90 degrees, 95 degrees, 100 degrees, 105 degrees, or any other desired angle to give foldable seat base 100 the desired height from a seating surface at front cross member 106. The term approximately as used herein in reference to an angle may refer to a range of +/−2.5 degrees, +/−5 degrees, or +/−10 degrees from the identified angle.

In various embodiments, rear legs 122 extend from frame 102 at an angle β. Angle β may be 90 degrees or greater to enhance stability, though an angle β less than 90 degrees may still function as a seat base. For example, angle β may approximately 90 degrees, 95 degrees, 100 degrees, 105 degrees, or any other desired angle to give foldable seat base 100 the desired height from a seating surface at rear cross member 108.

In various embodiments, front legs 120 and rear legs 122 may comprise an "H" shape. Front legs 120 may comprise two vertical legs 130 of substantially the same length as one another. A cross member 132 may extend between the two vertical legs 130 and be coupled to the two vertical legs to laterally support the two vertical legs 130. Rear legs 122 may comprise two vertical legs 134 of substantially the same length as one another. A cross member 136 may extend between the two vertical legs 134 and be coupled to the two vertical legs 134 to laterally support the two vertical legs 134. Vertical legs 132 and vertical legs 134 may comprise different heights if desired to situate the upper surface of frame 102 and an angle or pitch relative to a seating surface (e.g., the ground, a rock, a platform, a stationary truck bed, etc.).

In various embodiments, one or more guide 140 may be coupled to frame 102 near front legs 120 and/or rear legs 122. Guide 140 is shown as a flat metal protrusion from frame 102. Guide 140 may be welded to frame 102 in various embodiments where guide 140 and frame 102 are both metal. Guide 140 may comprise a rounded edge, squared edge, jagged edge, or smooth edge. Guide 140 may also include recess 142 suitable for receiving a retention pin 144 to retain front legs 120 and/or rear legs 122 in a deployed position.

In various embodiments, retention pin 144 may comprise a rounded head with a spring-loaded bias to protrude from front legs 120 and/or rear legs 122. Retention pin 144 may be retained wholly or partially within front legs 120 and/or rear legs 122 in the stowed position. In response to being in a fully or partially stowed position, guide 140 and/or frame 102 may cover retention pin 144 such that retention pin 144 presses against frame 102 and/or guide 140.

Figure 2A:
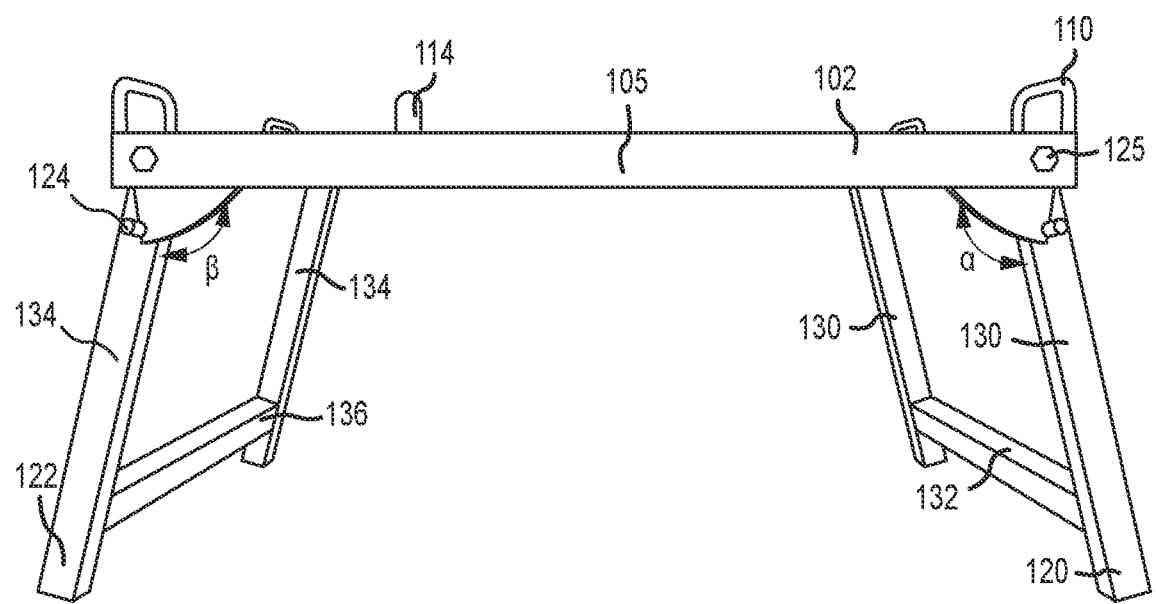
FIGS. 2A-2H illustrate a seat base in a deployed position, in accordance with various embodiments.
Figure 2B:
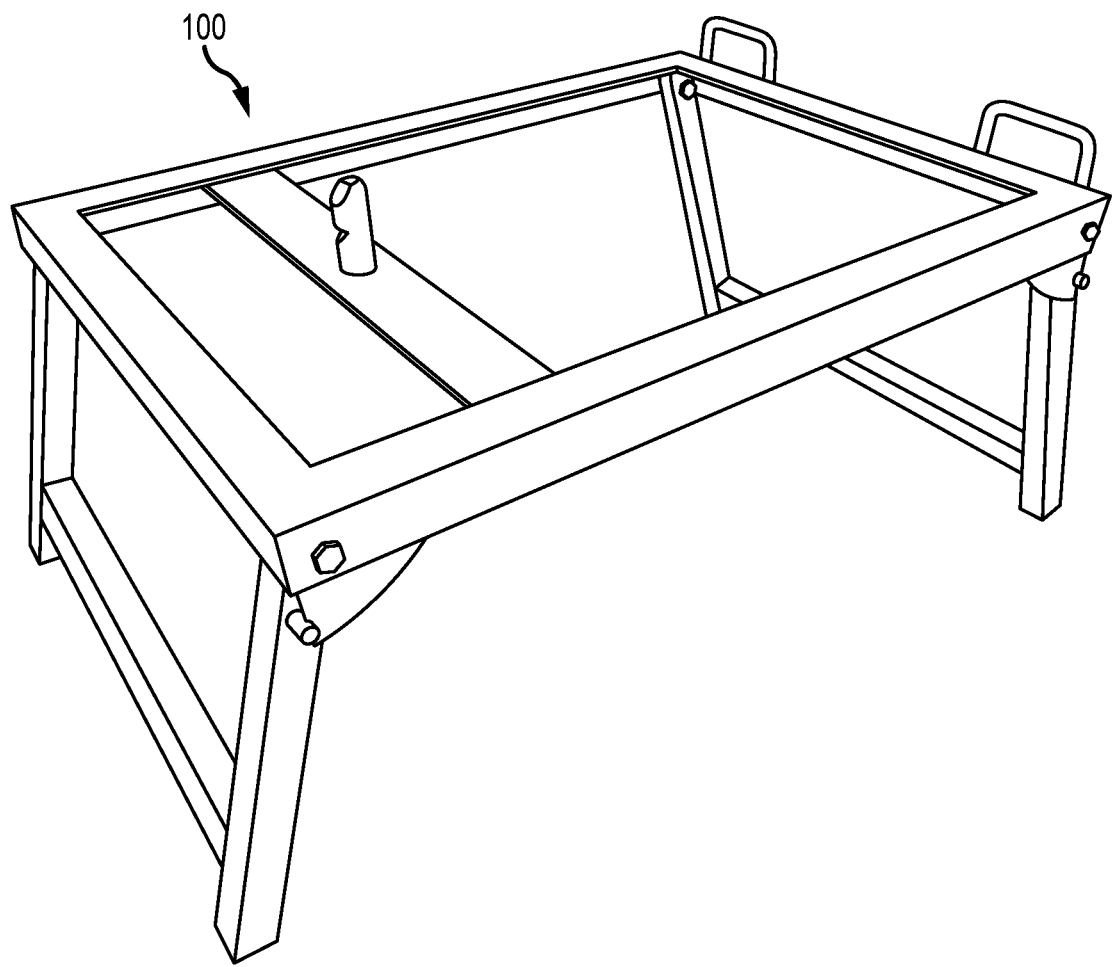
Figure 2C:
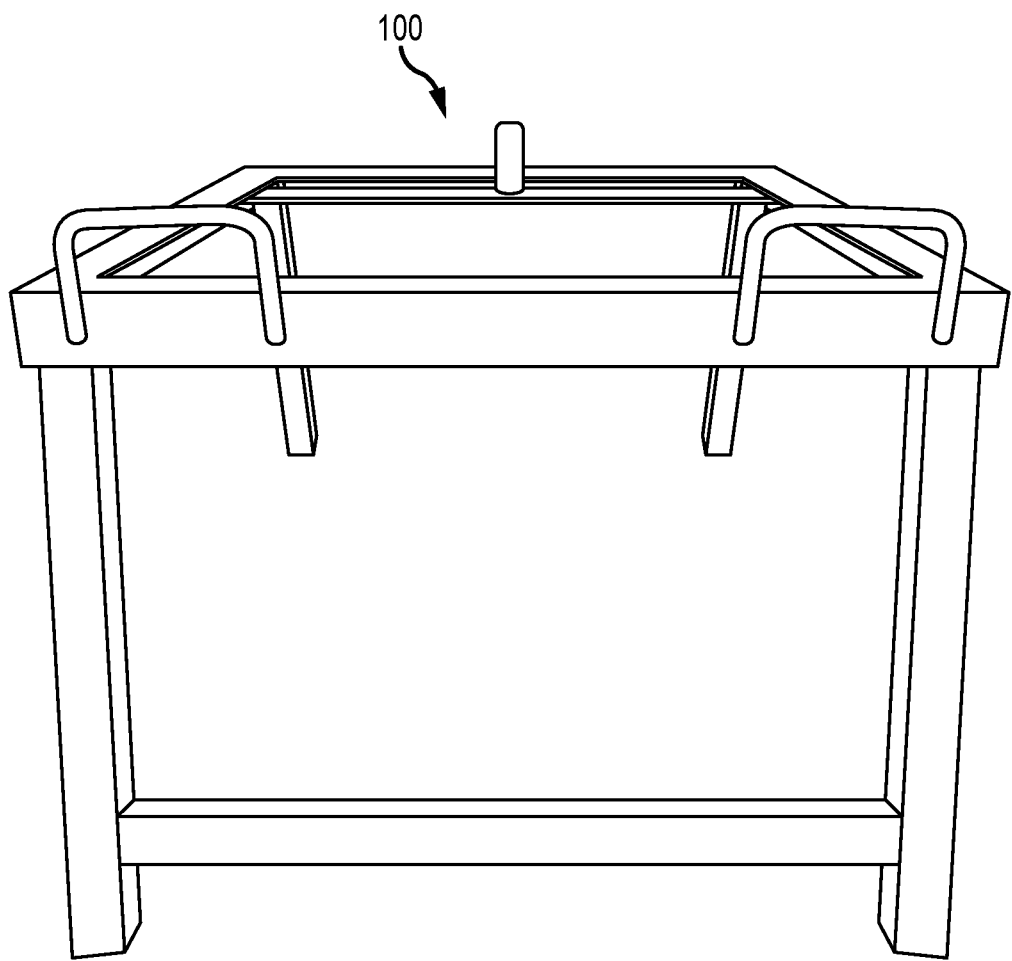
Figure 2D:
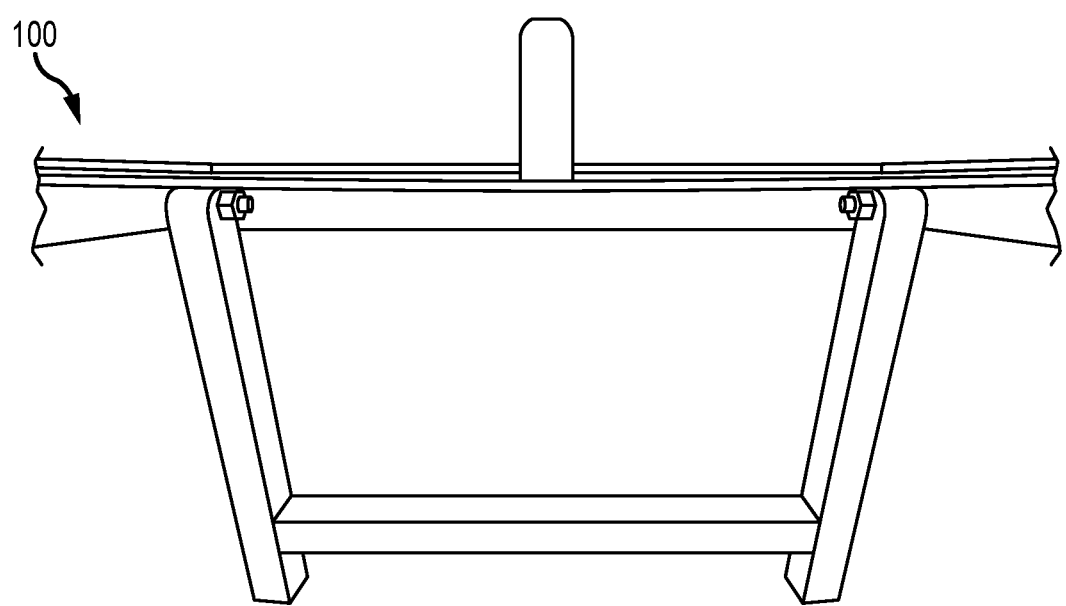
Figure 2E:
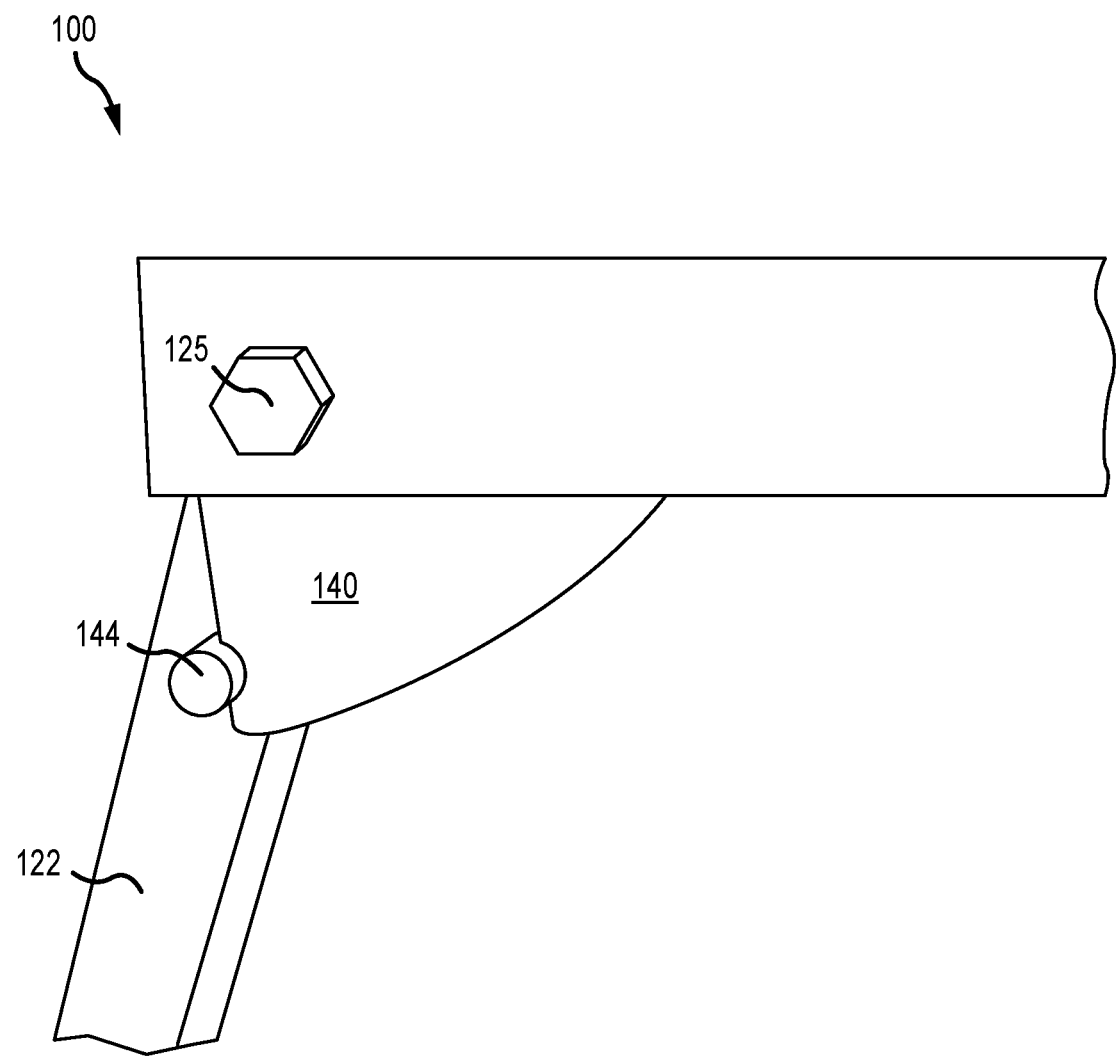
Figure 2F:
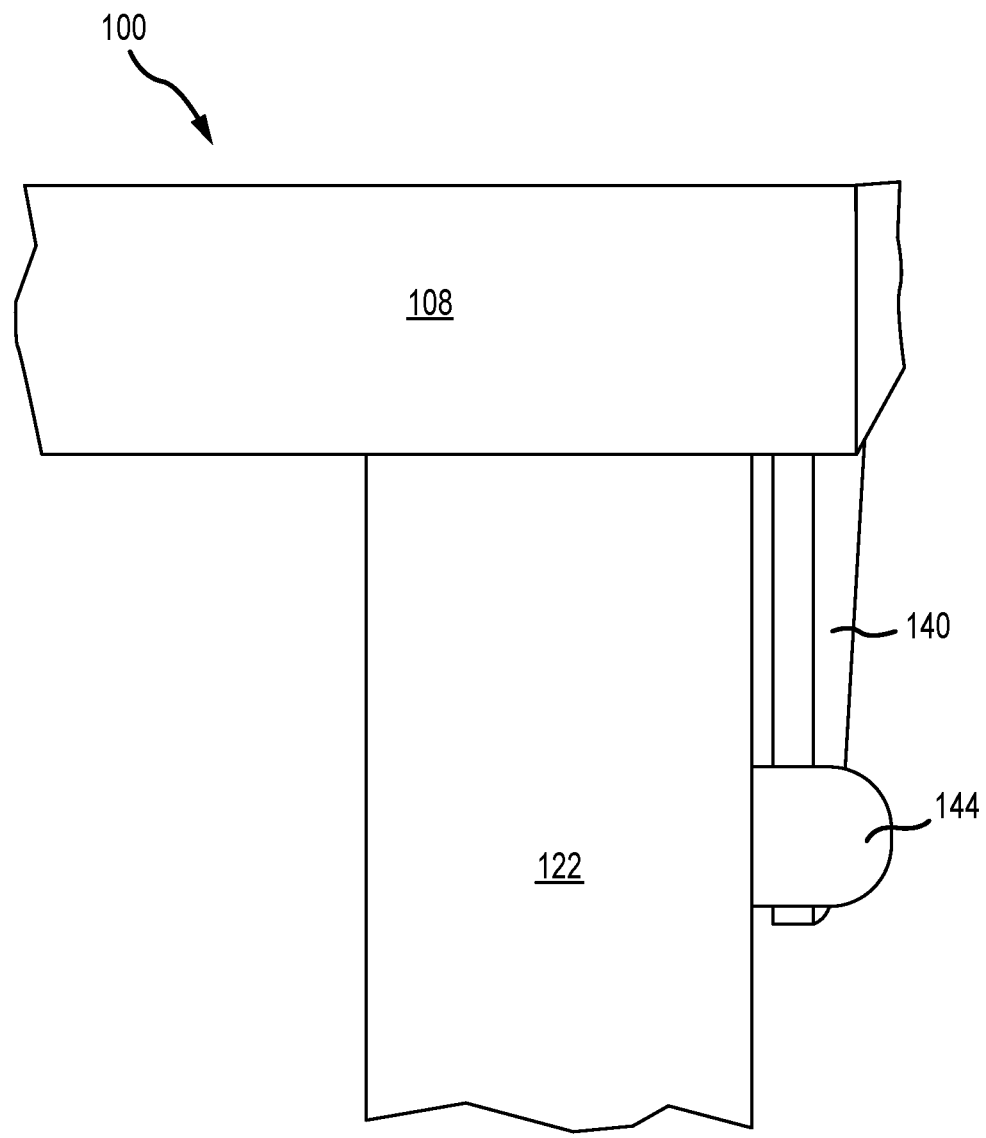
Figure 2G:
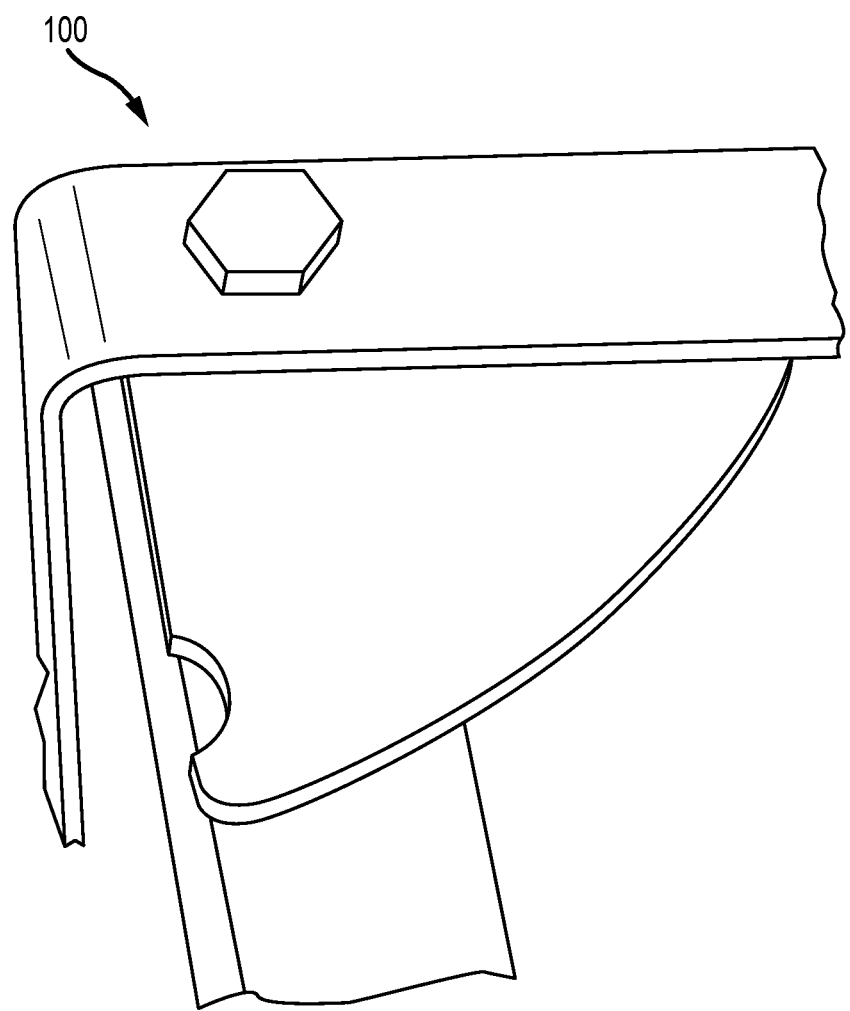
Figure 2H:
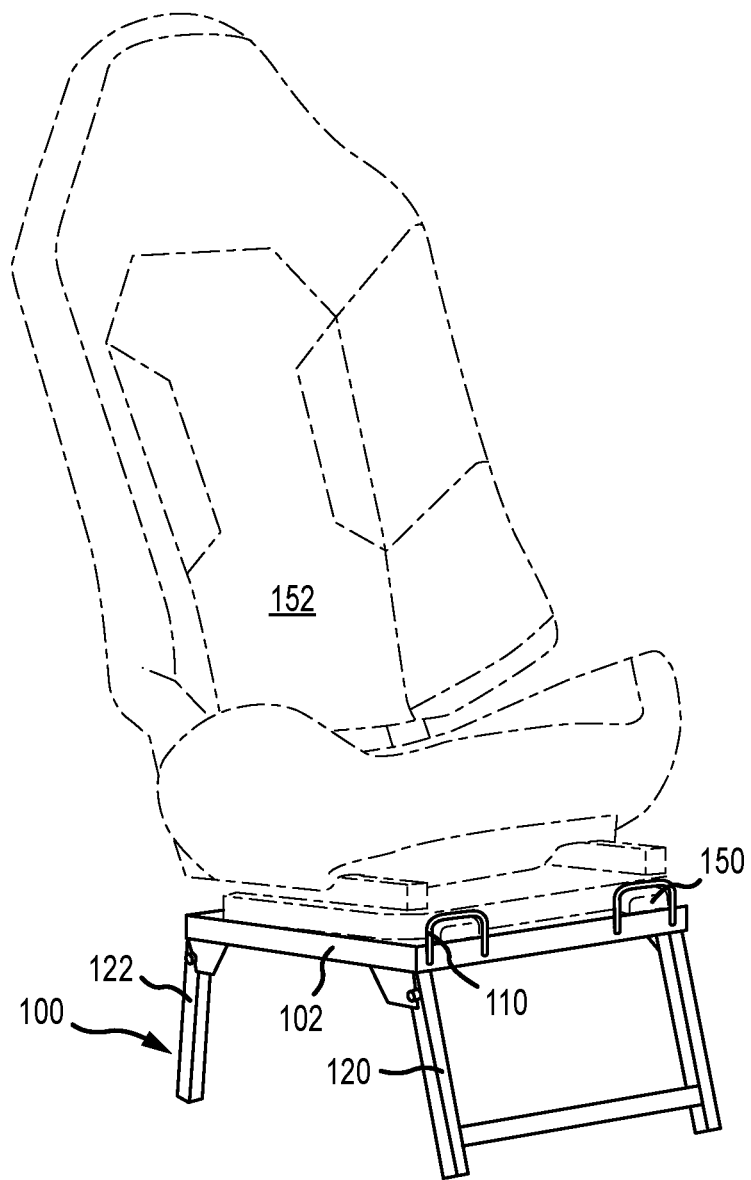
Figure 3A:
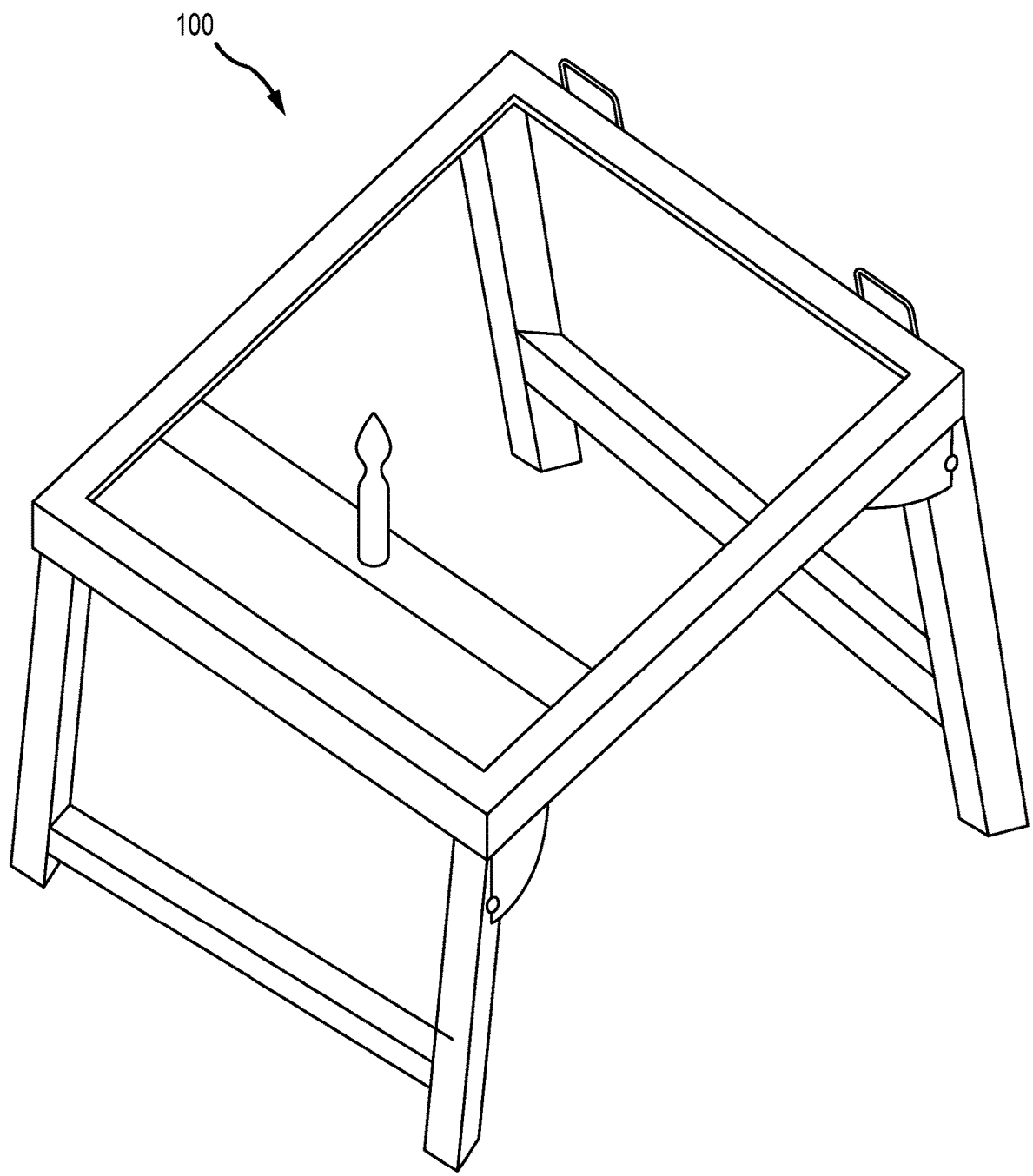
FIGS. 3A-3I illustrate a seat base similar to the seat base of FIGS. 1A-2H with example measurements, in accordance with various embodiments.
Figure 3B:
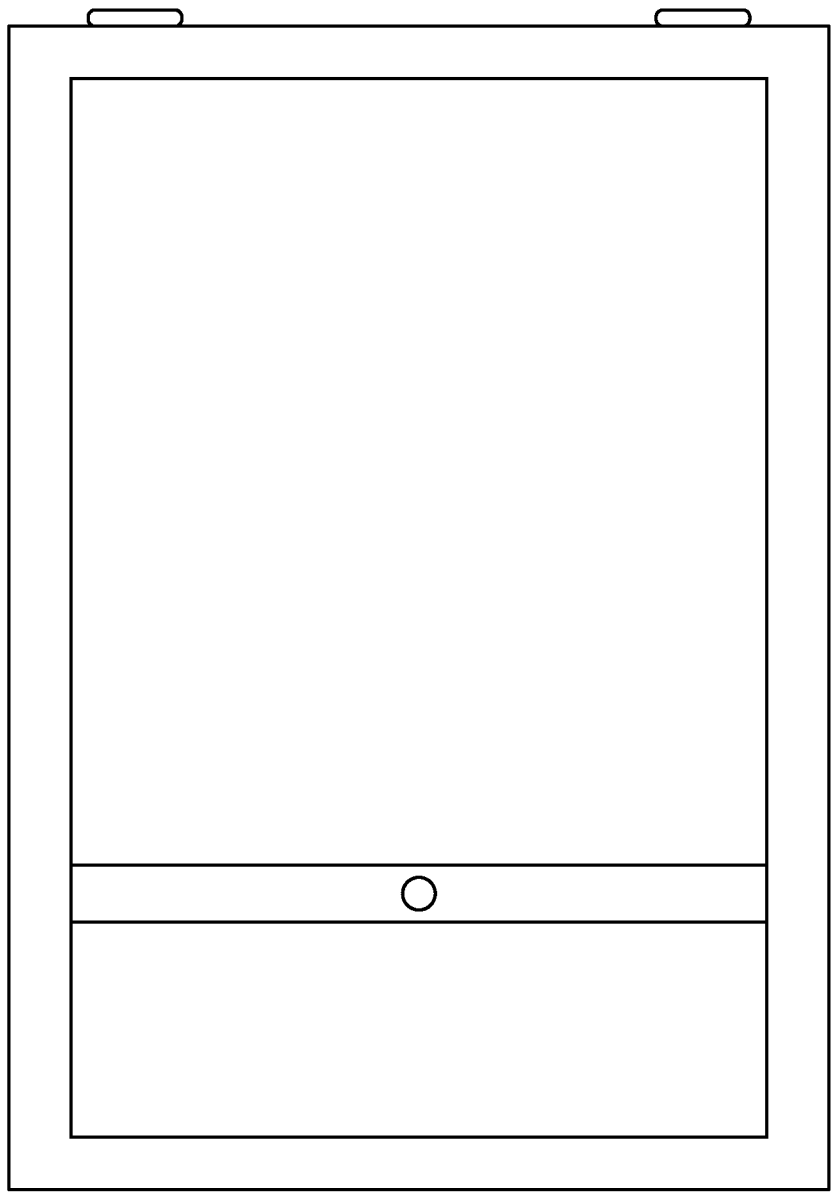
Figure 3C:
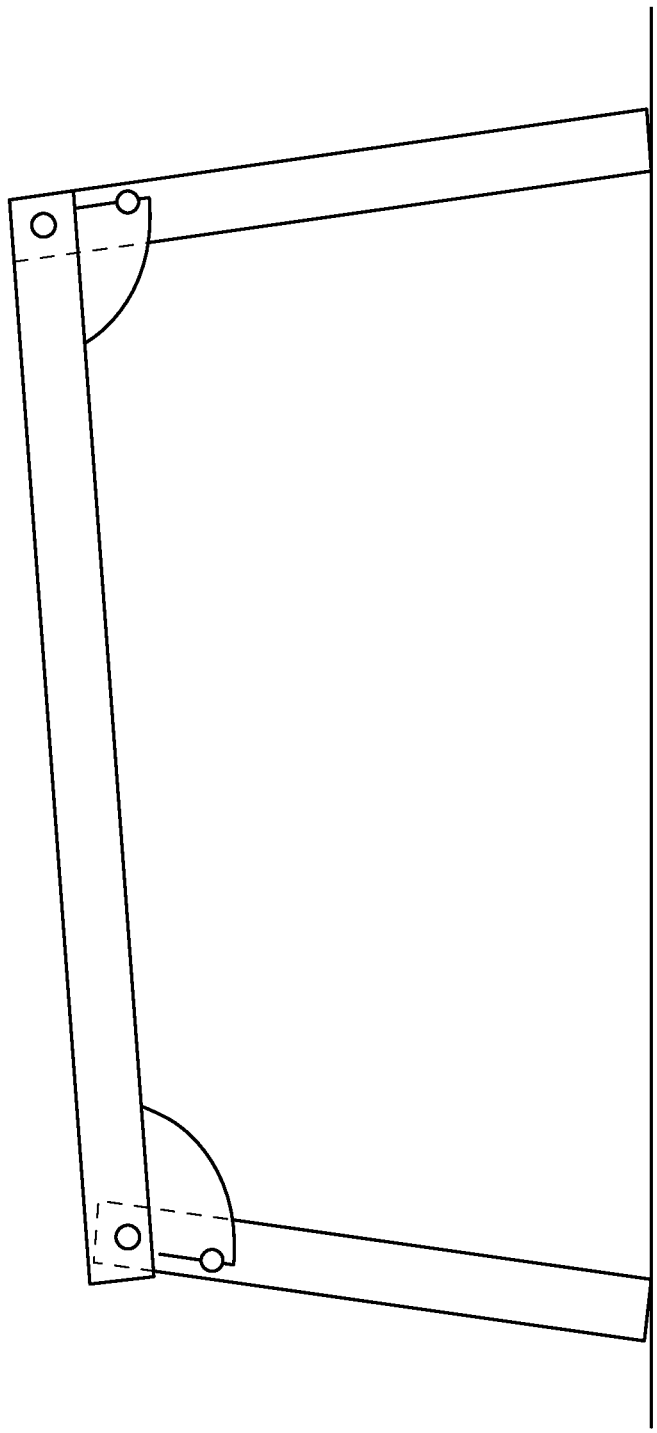
Figure 3D:
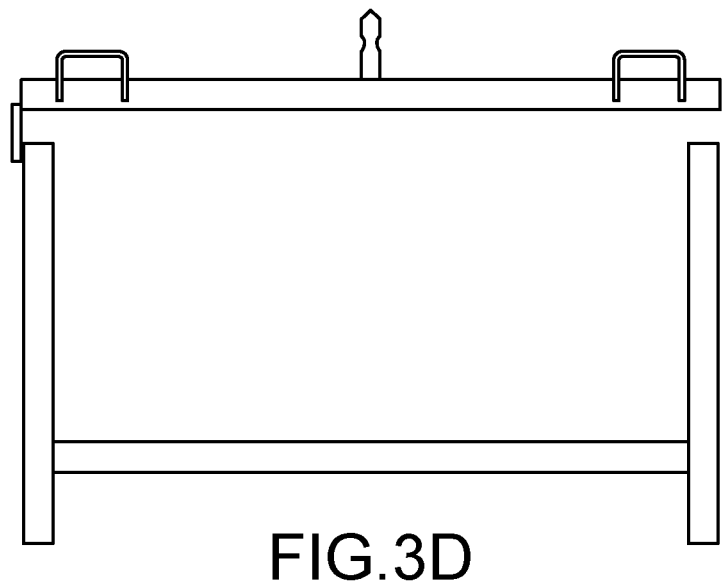
Figure 3E:
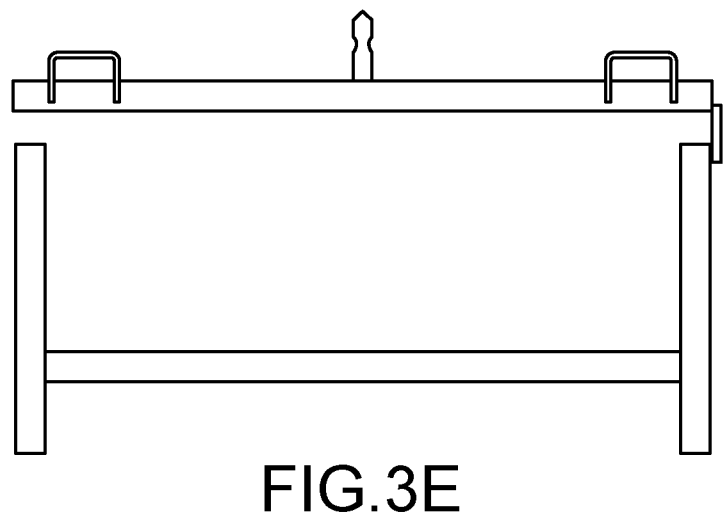
Figure 3F:
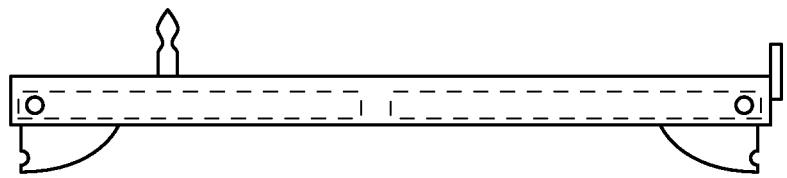
Figure 3G:
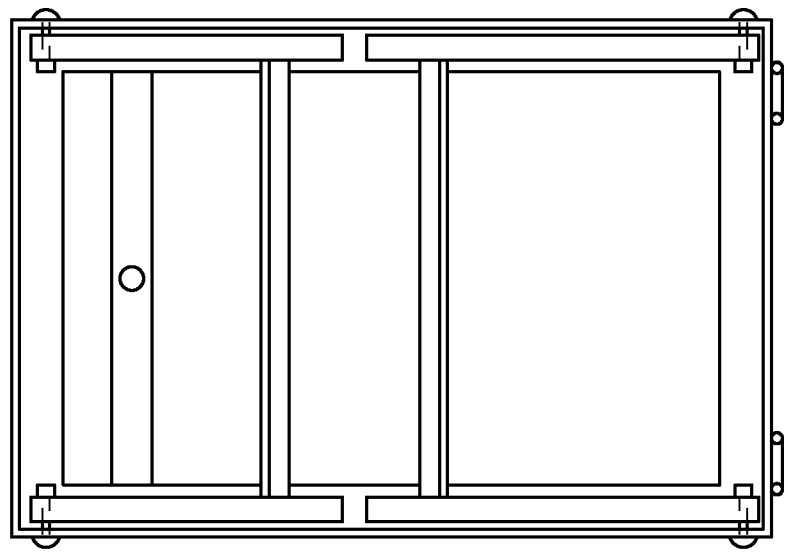
Figure 3H:
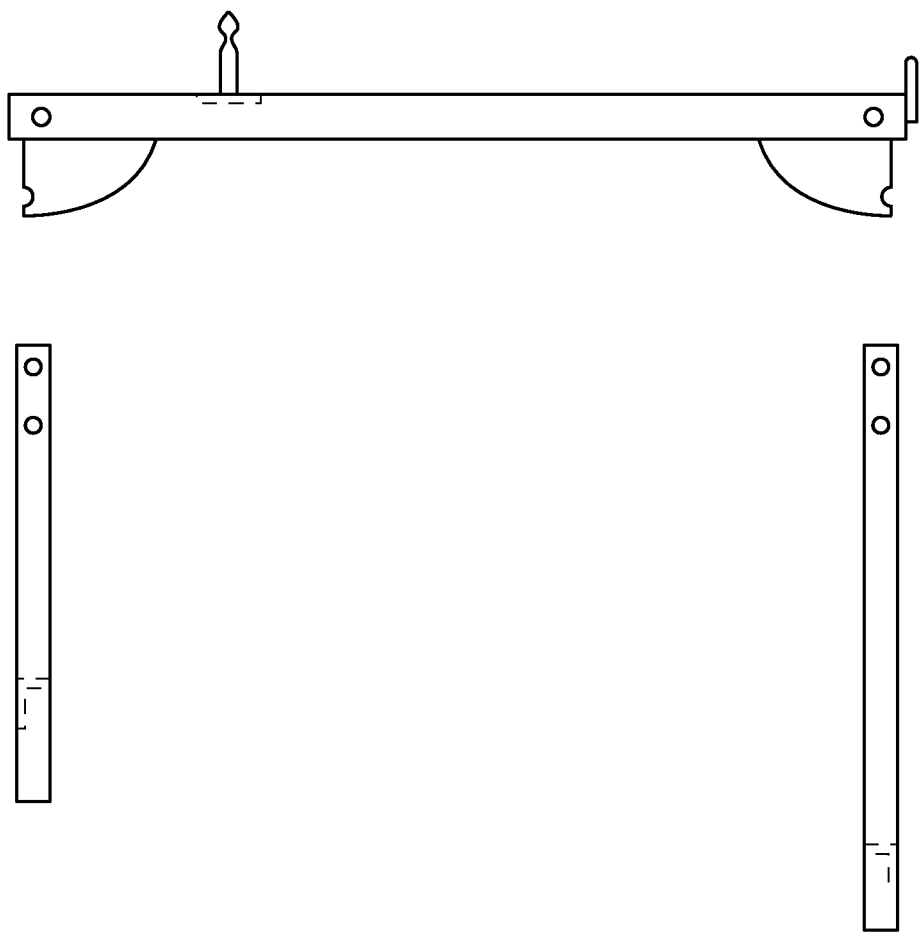
Figure 3I:
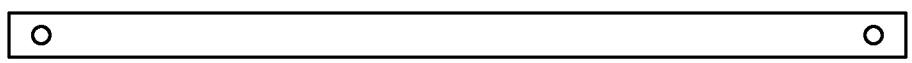

In response to the front legs 120 and/or rear legs 122 translating into a deployed position, retention pin 144 may become uncovered and free to translate outward from front legs 120 and/or rear legs 122. Retention pin 144 may rest in the recess defined by guide 140 and/or against guide 140 in response to front legs 120 and/or rear legs 122 being in a deployed position. Retention pin 144 and guide 140 may thus retain front legs 120 and/or rear legs 122 in the deployed position. Retention pin 144 may be depressed into front legs 120 and/or rear legs 122 to enable pin 144 to pass guide 140 and/or frame 102 and configure seat base 100 in a stowed position as shown in FIG. 2F. FIGS. 3A-3I depict seat base 100 with examples of suitable dimensions, in accordance with various embodiments. The dimensions of FIGS. 3A-3I are shown only as an example, and seat base 100 may comprise any other suitable dimensions.

Figure 4B:
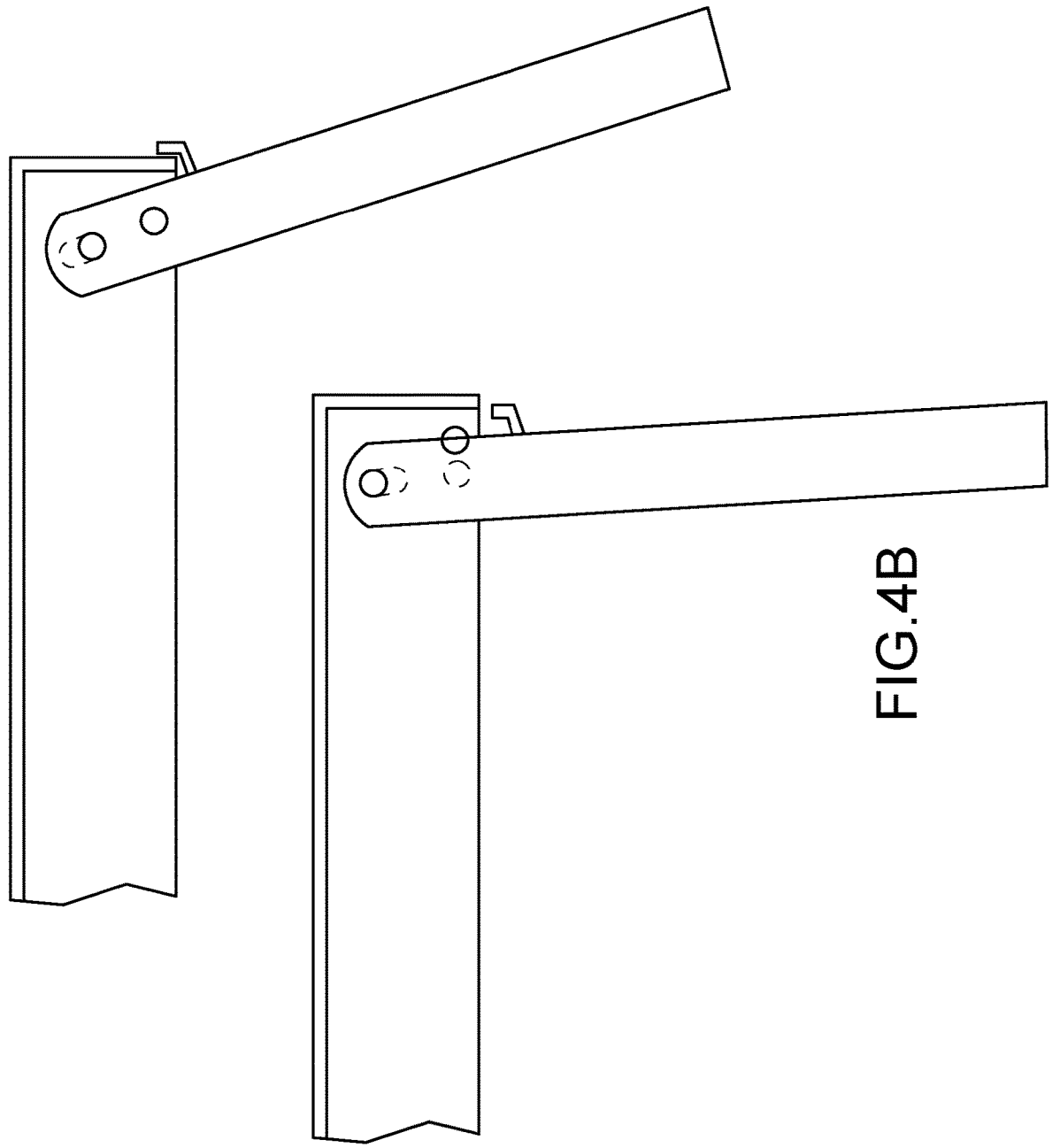
Figure 4C:
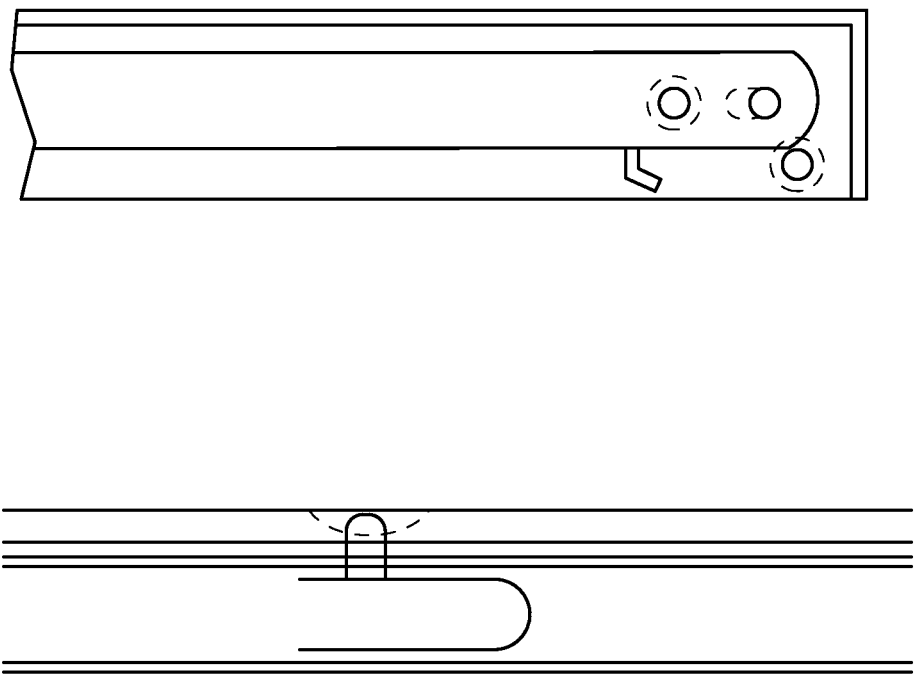

Referring now to FIGS. 4A to 4C, a seat base 400 is shown similar to seat base 100. Seat base 400 differs from seat base 100 in that seat base 400 comprises tab 402 extending from leg 404. Tab 402 may engage frame 406 in response to leg 404 being configured in a deployed position. Tab 402 may retain seat base 400 in the deployed position. Tab 402 may retain legs in an extended position in a manner similar to guide 140 of FIGS. 1-3. In various embodiments, tab 402 may be used in conjunction with or in alternative to guide 140. Embodiments relying on tab 402 for leg retention may have a reduced profile height. Seat base 400 may stow in a compact position and mount to both a seat and a vehicle's floor pan or seat mount. In that regard, seat base 400 may be installed in a vehicle, while in use, between the seat and the mounting point on the vehicle. In that regard, seat base 400 may fully or partially replace or may supplement one or more mounting component beneath a seat while in use.

Figure 5A:
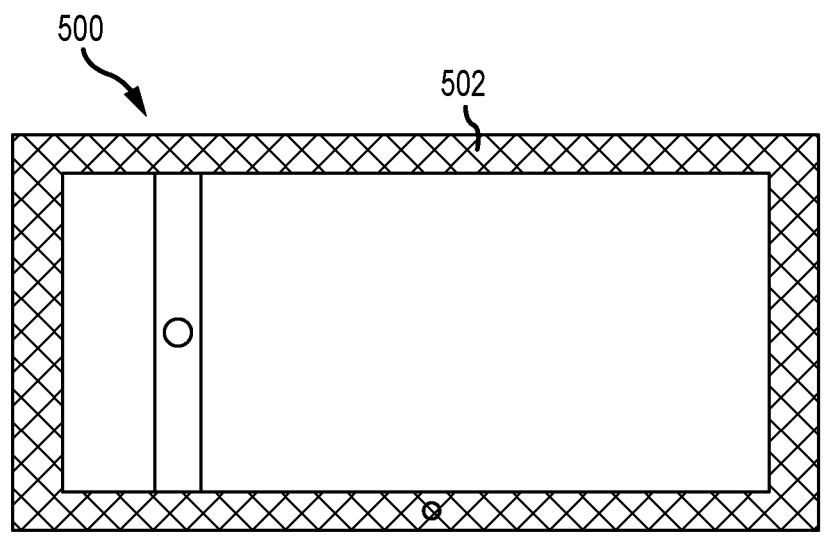
FIGS. 5A-5C illustrate a seat base made from molded material, in accordance with various embodiments.
Figure 5B:
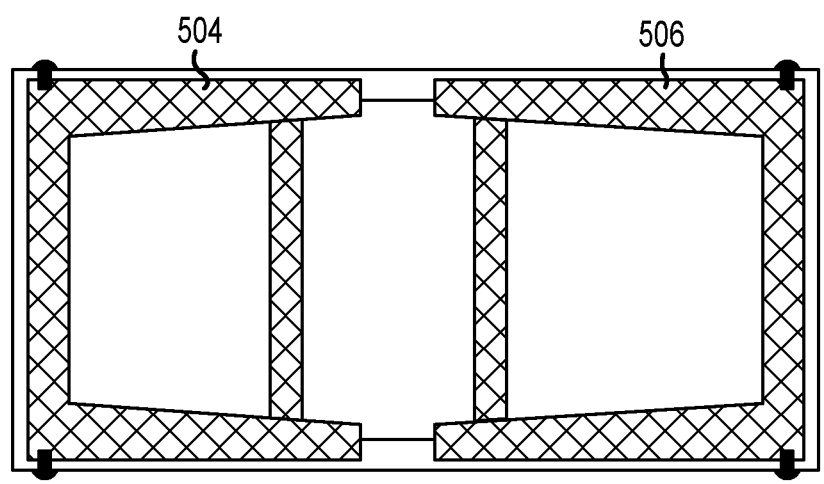
Figure 5C:
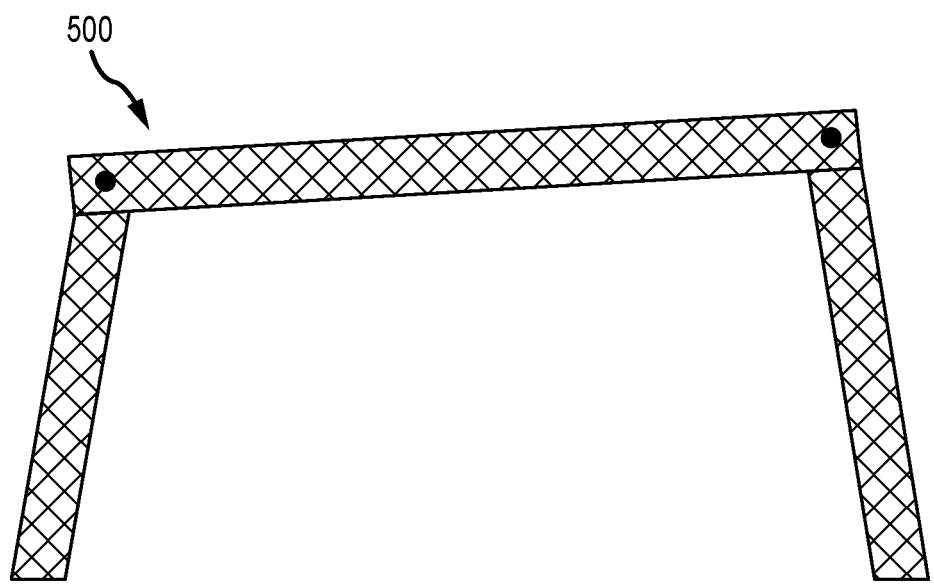

With reference to FIGS. 5A-5C, seat base 500 is shown comprising molded plastic and/or metal, in accordance with various embodiments. Seat base 500 may comprise frame 502 with front legs 504 and rear legs 506 hingedly coupled to frame 502. Frame 502, front legs 504, and/or rear legs 506 may be formed from molded plastic, cast metal, stamped metal, or other techniques that allow formation of integral legs and cross members. In various embodiments, seat base 500 may stow in a compact position and mount to both a seat and a vehicle's floor pan or seat mount. In that regard, seat base 500 may be installed in a vehicle, while in use, between the seat and the mounting point on the vehicle. In that regard, seat base 500 may fully or partially replace one or more mounting component beneath a seat while in use.

The seat bases described herein may stow in a compact volume. The portable seat bases may also engage a vehicle seat and rest on the ground to position the seat at a desired height and/or pitch. In that regard, the seat base enables use of vehicle seats outside of the vehicle and resting on a seating surface. The seat bases described herein may also be installed in a vehicle, while in use, between the seat and the mounting point on the vehicle. Seat bases mountable while the vehicle is in use may conserve space for the base during transportation, reduce the need for mounting brackets or storage tools, and rapid deployment of the seat base.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat base, comprising:
   a frame with a polygonal geometry;
   a first leg assembly hingedly coupled to the frame and configured to fold into an open area defined by the frame;
   a second leg assembly hingedly coupled to the frame and configured to fold into the open area defined by the frame;
   an interior cross member fixedly coupled to the frame;
   a pin protruding from the cross member, wherein the pin is configured to engage a seat; and
   a plurality of D-shaped loops extending from the frame with each D-shaped loop configured to retain a foot extending from the seat.

2. The seat base of claim 1, wherein the first leg assembly comprises: a first leg hingedly coupled to the frame; a second leg hingedly coupled to the frame; and a cross member coupled to the first leg and the second leg.

3. The seat base of claim 1, further comprising a guide protruding from the frame.

4. The seat base of claim 3, wherein the guide defines a recess.

5. The seat base of claim 4, further comprising a retention pin configured to engage the recess and retain the first leg assembly in a deployed position.

6. The seat base of claim 1, wherein the frame comprises a perimeter having a quadrilateral geometry.

7. A stowable seat base comprising:
   a frame with a polygonal geometry;
   a first leg assembly hingedly coupled to the frame by a first pin extending through the first leg assembly and the frame, wherein the first leg assembly is foldable into an open area defined by the frame;
   a second leg assembly hingedly coupled to the frame by a second pin extending through the second leg assembly and the frame, wherein the second leg assembly is foldable into the open area defined by the frame;
   an interior cross member fixedly coupled to the frame;
   a pin protruding from the cross member, wherein the pin is configured to engage a seat; and
   a loop extending from the frame and configured to engage the seat, the loop having a D-shaped geometry.

8. The seat base of claim 7, wherein the first leg assembly comprises: a first leg hingedly coupled to the frame; a second leg hingedly coupled to the frame; and a cross member coupled to the first leg and the second leg.

9. The seat base of claim 7, further comprising a guide protruding from the frame.

10. The seat base of claim 9, wherein the guide defines a recess.

11. The seat base of claim 10, further comprising a retention pin configured to engage the recess and retain the first leg assembly in a deployed position.

12. The seat base of claim 7, wherein the frame comprises a perimeter having a quadrilateral geometry.

13. The seat base of claim 7, wherein a first angle between the first leg assembly and the frame is greater than or equal to 90 degrees.

14. The seat base of claim 13, wherein a second angle between the second leg assembly and the frame is greater than or equal to 90 degrees.

\* \* \* \* \*